Jan. 27, 1970 W. D. WARTERS 3,492,576

DIFFERENTIAL PHASE MODULATED COMMUNICATION SYSTEM

Filed July 29, 1966

2 Sheets-Sheet 1

INVENTOR
W. D. WARTERS
BY
Sylvan Sherman
ATTORNEY

United States Patent Office 3,492,576
Patented Jan. 27, 1970

3,492,576
DIFFERENTIAL PHASE MODULATED COMMUNICATION SYSTEM

William D. Warters, Middletown Township, N.J., assignor to Bell Telephone Laboratories, Incorporated, Murray Hill and Berkeley Heights, N.J., a corporation of New York Filed July 29, 1966, Ser. No. 568,893
Int. Cl. H04j 1/20
U.S. Cl. 325—30 7 Claims

ABSTRACT OF THE DISCLOSURE

A pulse code modulation communication system wherein a pulse-encoded signal is used to frequency modulate a high frequency oscillator above and below a reference frequency. In the preferred embodiment, the phase shift produced by said modulation is equal to $\pm\pi/2$ radians, when integrated over one time slot. At the receiver, a differential phase detector senses the relative phase shift produced between pairs of pulses in adjacent time slots and recovers the original binary signal information.

This invention relates to differential phase modulated (DPM) communication systems for the transmission of coded information.

The transmission of coded information is accomplished by the sequential transmission of one of several possible signals during regularly assigned time intervals. In a binary system, one of two coded states, called a "one" or a "mark," is identified with one of two possible signals, while the second coded state, called a "zero" or a "space," is identified with the other of the two signals. In one well-known system, the two binary states are simply represented by the presence or absence of a signal. In another system, the frequency of the signal is used to indicate the two binary code states.

An equally useful method of interpretation is to associate the encoded information with changes in the state of the signal, as observed by comparing the signals in two adjacent time intervals. In this type of system, a change in signal state can be associated, for example, with a "mark," whereas no change in signal state can be associated with a "space." One representation of this mode of operation is the so-called differential phase modulated (DPM) system of communication in which the phases of the signals in two adjacent time intervals are compared. Typically, in such a system using prior art methods, differential phase shift is produced by means of amplitude modulation techniques. First, the baseband binary signal is converted to a differential binary signal by means of a translator. Since, in a binary DPM system, the two signals are advantageously either in phase, or 180 degrees out of phase, the converted signal is then used to amplitude modulate a constant frequency carrier signal in a manner to produce a phase inversion. (See "Phone Line Data Transmission Systems," by Kenneth Perry, Massachusetts Institute of Technology, Lincoln Laboratory Group Report M24–54, Sept. 1955.)

The present invention resides in the discovery that substantial advantages can be realized in the implementation and operation of differential phase modulated communication systems by the utilization of frequency modulation techniques to produce the differential phase modulated signal (FM–DPM). Thus, in accordance with the present invention, the information, at baseband, is first made to be contained in the choice of pulse polarity, and is then used to cause the frequency of a signal oscillator to deviate above and below its normal unmodulated frequency. The resulting phase shift can be computed by integrating the frequency excursion over each of the time intervals. Since in a binary system optimum noise immunity is obtained when the two possible signal states are anti-correlated, that is, when the two possible values of phase shift differ by 180 degrees, a modulator for use in a binary system is advantageously adjusted such that $$2\pi\int_{\Delta t}(f_{+}-f_{0})dt+2\pi\int_{\Delta t}(f_{0}-f_{-})dt=\pi$$

where:

$\Delta t$ is the duration of each time interval;

$f_0$ is the unmodulated signal oscillator frequency;

$f_+$ is the instantaneous frequency of the signal oscillator when caused to increase above its unmodulated frequency by the baseband binary signal;

and $f_-$ is the instantaneous frequency of the signal oscillator when caused to decrease below its unmodulated frequency by the baseband binary signal.

An FM–DPM system in accordance with the present invention offers advantages of efficiency and simplicity. For example, conversion from polar binary baseband to differential phase modulated carrier signal is performed directly by frequency modulating a voltage controlled oscillator. Because of the differential relationship between frequency and phase, no flip-flop or other binary-to-differential translator is required, as in the prior art. In addition, the linearity of the frequency-voltage characteristic of the frequency modulated oscillator is unimportant as the required phase shift is established simply by adjusting the amplitude of the baseband signal applied to the FM oscillator. Finally, the FM nature of the signal allows phase-locked oscillators to be used for gain and limiting.

At the receiver, demodulation can be performed in a standard differentially coherent phase detector with its well-known near-optimum signal-to-noise ratio. Furthermore, timing information is obtainable independently of signal statistics by means of an FM discriminator followed by a full wave rectifier since the signal in every time slot is frequency modulated. These and other objects and advantages, the nature of the present invention, and its various features, will appear more fully upon consideration of the various illustrative embodiments now to be described in detail in connection with the accompanying drawings, in which:

For purposes of explanation and illustration, a binary system is described hereinbelow. However, it will be obvious to those skilled in the art that a system in accordance with the invention can be extended to accommodate multilevel baseband encoded signals.

Figures 1, 2:
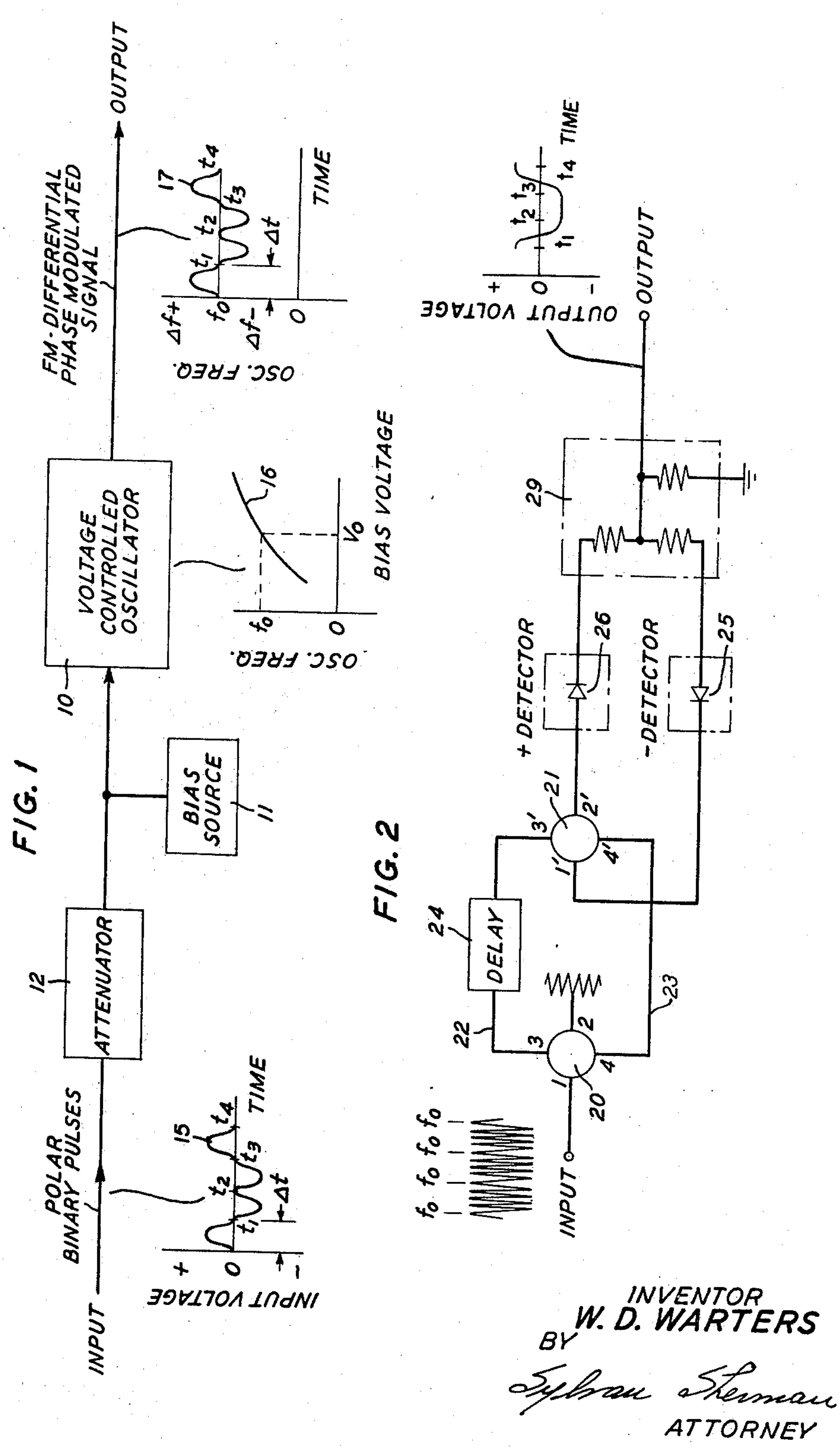
FIG. 1 shows, in block diagram, a frequency modulator for use in an FM–DPM system.
FIG. 2 shows a differential phase detector.

Referring to the drawings, FIG. 1 shows, in block diagram, a frequency modulator for producing an FM differential phase modulated signal for use in a pulse code communications system in accordance with the invention. The modulator comprises a voltage controlled oscillator 10, such as a tunnel diode oscillator, whose frequency of oscillation is a function of the bias applied thereto. The unmodulated oscillator frequency is established by a bias source 11. Frequency modulation is produced by pulses which are coupled to oscillator 10 in a manner to vary its instantaneous bias. An attenuator 12 is provided to adjust the amplitude of the binary pulses for reasons which will be explained more fully hereinbelow.

For purposes of explanation, FIG. 1 also includes a graphical representation of a polar binary input wave, the oscillator frequency-bias characteristic, and the frequency variations of the resulting output wave. The input wave, represented by curve 15 comprises a sequence of positive and negative pulses, usually referred to as polar binary pulses. Each pulse occupies a time slot of time duration $\Delta t$. For purposes of illustration, four pulses are represented.

When coupled to oscillator 10, the pulses cause the bias and, hence, the instantaneous frequency of the oscillator to vary in a manner indicated by curve 16 and, thereby, to produce an output signal whose instantaneous frequency is as given by curve 17.

As is known, a frequency varying signal $f(t)$ undergoes a phase shift $\Delta\varphi$ relative to a reference signal, at frequency $f_o$, that is given by $$\Delta\varphi=2\pi\int_{t_n}^{t_m}[f(t)-f_0]dt$$

where the integration is over the time interval $t_n$ to $t_m$. With respect to the modulator of FIG. 1, the integration is taken over at one time slot $\Delta t$. When this is done for the first pulse, it is found that the phase of the output signal $f_o$ at time $t_1$ is advanced with respect to what it would have been in the absence of the frequency modulation. Similarly, the frequency modulation of the oscillator during the time interval $t_1$ to $t_2$ tends to retard the phase of the signal so that the signal at time $t_2$ is phase delayed with respect to the unmodulated signal.

Since the optimum noise immunity is obtained in a binary DPM system when the two possible signal states are anti-correlated, that is, when the two possible values of $\Delta\varphi$ differ by 180 degrees, the bias voltage and the input pulse amplitudes are advantageously adjusted such that the magnitudes of the integrated frequency deviations in the positive and negative directions sum to $\pi$. That is, $$\Delta\varphi_+ + \Delta\varphi_- = \pi$$

where $$\Delta\varphi_+ = 2\pi\int_{\Delta t}[f_+ - f_o]dt$$

and $$\Delta\varphi_- = 2\pi\int_{\Delta t}[f_o - f_-]dt$$

It is one of the advantages of the present invention that the total differential phase shift, $\pi$, can be achieved either by adjusting the pulse amplitudes such that $\Delta\varphi_+=\pi/2$ and $\Delta\varphi_-=\pi/2$, or by selecting some other, unequal division of the total phase shift between the two pulse polarities. In general, the total phase shift may be divided such that either $$\Delta\varphi_+<\frac{\pi}{2} \text{ and } \Delta\varphi_->\frac{\pi}{2}$$

or $$\Delta\varphi_+>\frac{\pi}{2} \text{ and } \Delta\varphi_-<\frac{\pi}{2}$$

where $\Delta\varphi_+ + \Delta\varphi_- = \pi$ in both cases.

This freedom of choice illustrates a second advantage of the present invention. Usually there is a requirement that the frequency characteristic of an FM modulator be linear with voltage. In an FM–DPM system, however, it is only the area under the frequency-time curve that is important. Hence, the modulator characteristic need not be linear nor even a continuous function of voltage. Preferably, however, the modulator characteristic is monotonic with frequency so that the desired phase shift can be obtained simply by adjusting the amplitudes of the binary pulses.

FIG. 1 also illustrates the simplicity of an FM–DPM system wherein a baseband binary signal is converted to a differential phase modulated signal by means of a simple voltage controlled oscillator.

FIG. 2 is illustrative of a typical differential phase detector that can be used in an FM–DPM system. In general, the detector comprises a pair of similar hybrid junctions 20 and 21, each of which has two pairs of conjugate branches. The pairs of conjugate branches associated with hybrid 20 are designated 1–2 and 3–4. Those associated with hybrid 21 are designated 1′–2′ and 3′–4′.

In the arrangement illustrated in FIG. 2, branch 1 of hybrid 20 is the input branch to which the received signal is applied. Branch 2 is resistively terminated. Branches 3 and 4 of hybrid 20 are connected to branches 3′ and 4′ of hybrid 21 by means of wavepaths 22 and 23, respectively. One of the wavepaths 22 includes a delay network 24 for reasons which will be explained in greater detail hereinbelow.

The remaining branches 1′ and 2′ of hybrid 21 are connected respectively to one electrode of oppositely poled diodes 25 and 26 which, in FIG. 2, are designated "− detector" and "+ detector." The other electrode of each diode is connected to a resistive network 29 from which the detected output signal is taken.

It is the function of the detector to compare the relative phase of the signals in adjacent time slots. A comparison which indicates that there has been no relative phase shift is indicative of ont of the two possible binary states, whereas an indicated 180 degree phase shift is indicative of the other binary state. As has been noted above, the differential phase shift between sampling periods, in the most general case, is either $+\theta$ degrees or $-(180-\theta)$ degrees for the two binary states. (In the special case in which $\Delta\varphi_+=\Delta\varphi_-$, $\theta=\pm\pi/2$.) Accordingly, there are means provided to delay the signal one time slot and, in addition, to introduce an additional phase delay of $\theta$ degrees to establish the "0" or 180 degree phase relationship at branches 3′ and 4′ of hybrid 21. This is accomplished in the detector circuit of FIG. 2, by the inclusion of the delay network 24 in wavepath 22. Thus, in operation, a pulse in the $n^{th}$ time slot, arriving at hybrid 20, is divided into two equal components. One component propagates along path 23, the other along 22. Similarly, a pulse in the $n+1^{th}$ time slot, arriving at hybrid 20, is also divided into two components, one of which propagates along path 23. Because of the added delay in path 22, the component of the $n+1^{th}$ pulse in path 23 arrives at branch 4′ of hybrid 21 at the same time that the delayed component of the previous pulse arrives at branch 3′ of hybrid 21. If these two signal components from adjacent time slots are in phase, they combine in branch 2′ and cause a current to flow through diode 26 and the resistive network 29 in a direction to produce a positive pulse at the output terminal of the detector. If, on the other hand, the two signal components are out of phase, they combine in branch 1′, thereby causing a current to flow through diode 25 and the resistive network 29 in the opposite direction, thereby producing a negative output pulse. In this manner the original polar binary baseband signal is recovered.

Figure 3:
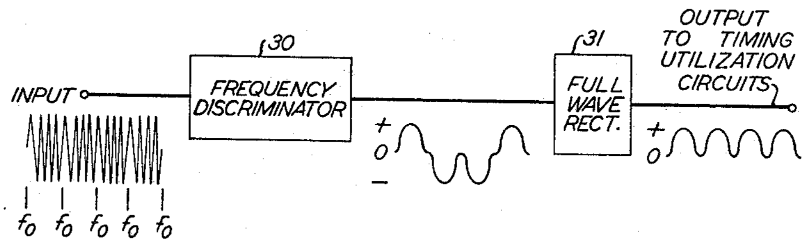
FIG. 3 shows the use of a frequency discriminator and full wave rectifier to recover timing information.
Figure 4:
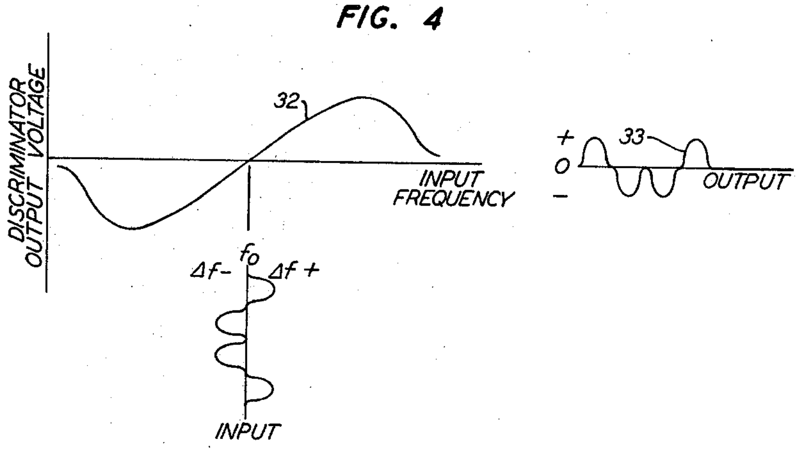
FIG. 4, included for purposes of explanation, shows a typical frequency discriminator characteristic.

As noted hereinabove, one of the advantages of FM differential phase modulation is the ability to extract timing information directly and simply from the received signal. This is illustrated in FIG. 3, which shows a timing recovery circuit using a frequency discriminator 30 of the type described by F. E. Terman at pages 606 and 607 of his book "Electronic and Radio Engineering," fourth edition, followed by a full wave rectifier 31. FIG. 4, included for purposes of explanation, shows a typical input frequency-output voltage discriminator characteristic 32.

In operation, a portion of the received signal is coupled to the discriminator which detects the frequency deviations $\pm\Delta f$ about the reference carrier frequency $f_o$ (or about an intermediate carrier frequency $f_{if}<f_o$) and converts them into voltage variations 33. Since the voltage variations can be both positive and negative, the discriminator 30 is followed by a full wave rectifier 31 for converting the polar output signal from the discriminator into a unipolar signal. The latter is, in turn, coupled to timing utilization circuits of the type usually associated with PCM receivers and repeaters.

It can be seen from FIG. 4 that if the frequency deviations about $f_0$ are unequal, due to a nonlinear modulator characteristic, the output pulses are also unequal. Some compensation can be made by returning the discriminator so that $f_0$ no longer falls at the crossover point. Another method of compensation involves separately adjusting the amplitudes of the positive and negative modulating pulses used to modulate the voltage controlled oscillator.

As indicated above, the principles of the invention can be extended to encompass the encoding of multilevel baseband signals. In such a system, each baseband signal amplitude causes a specific frequency deviation of the modulator which is translated into a corresponding phase shift. For a discussion of higher order DPM systems see "Data Transmission," by W. R. Bennett and J. R. Davey, McGraw-Hill Book Company, Chapter 10. Thus, it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A pulse code modulated communication system comprising means for encoding the wave energy to be transmitted into a time sequence of coherent alternating current pulses, occupying successive time slots, characterized in that each of said pulses comprises a frequency modulated signal whose instantaneous frequency varies during each of said time slots deviating above or below a reference carrier frequency; and means for receiving said sequence modulated pulses and sensing the relative phase shift produced by said frequency modulation over a period of time equivalent to one time slot.

2. A binary system according to claim 1 wherein the phase shifts produced by frequency deviations above and below said reference frequency are equal to $\theta$ degrees and $(180-\theta)$ degrees.

3. The system according to claim 1 including at said receiver means for extracting timing information from said frequency modulated signal comprising means for coupling said signal to a frequency discriminator and means for coupling the output from said discriminator to a full wave rectifier.

4. The method of transmitting information comprising the steps of: (1) encoding the information into a time sequence of coherent alternating current pulses occupying successive time slots wherein each pulse comprises a frequency modulated signal whose instantaneous frequency varies during each of said time slots deviating above or below a reference frequency; (2) transmitting said signals to a receiver; and (3) phase detecting said signals in a differentially coherent phase detector to determine the relative phase of said frequency modulated signals between instants separated by one time slot.

5. A pulse code modulated communication system comprising: a source of polar binary pulses occupying successive time slots; a frequency modulatable oscillator; means for coupling said pulses to said oscillator thereby producing a sequence of frequency modulated signal pulses whose instantaneous frequency deviates above or below a reference frequency in accordance with the amplitude and polarity of said binary pulses; and means for receiving said frequency modulated signal including a differentially coherent phase detector for integrating the frequency deviation over a period of time equivalent to one time slot.

6. The system according to claim 5 wherein; said oscillator is a voltage controlled oscillator whose frequency of oscillation is a function of the bias applied thereto; and wherein said binary pulses modulate said bias.

7. The system according to claim 6 including means for adjusting the amplitude of said polar binary pulses thereby controlling the relative phase shift produced by said freqeuncy modulation.

References Cited

UNITED STATES PATENTS

| | | | |
|---|---|---|---|
| 3,117,305 | 1/1964 | Goldberg | 325—30 |
| 3,392,337 | 7/1968 | Neuburger | 329—110 |
| 2,091,271 | 8/1937 | Conklin | 329—137 X |
| 2,426,187 | 8/1947 | Earp | 329—137 X |
| 3,032,611 | 5/1962 | Montgomery | 178—66 |
| 3,324,401 | 6/1967 | Heslop et al. | 329—145 |

ROBERT L. GRIFFIN, Primary Examiner
JAMES A. BRODSKY, Assistant Examiner

U.S. Cl. X.R.

178—67, 88; 325—163, 320; 329—137